April 19, 1960

E. W. ALLARDT 2,933,587

WELDING THROAT FOR HIGH FREQUENCY ALTERNATING
CURRENT RESISTANCE WELDING OF TUBES

Filed Feb. 13, 1959

INVENTOR.
ERNST W. ALLARDT
BY
*J. P. Moran*
ATTORNEY

April 19, 1960 E. W. ALLARDT 2,933,587
WELDING THROAT FOR HIGH FREQUENCY ALTERNATING
CURRENT RESISTANCE WELDING OF TUBES
Filed Feb. 13, 1959 5 Sheets-Sheet 3
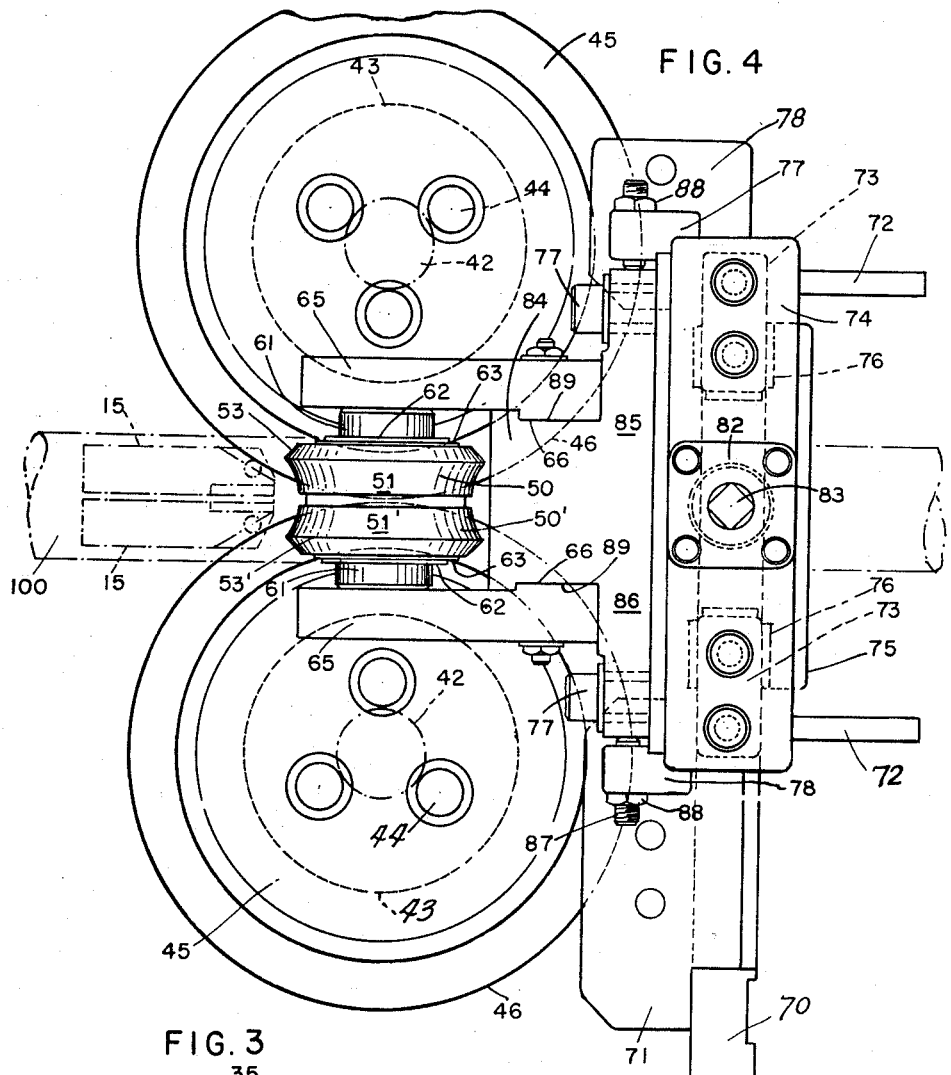
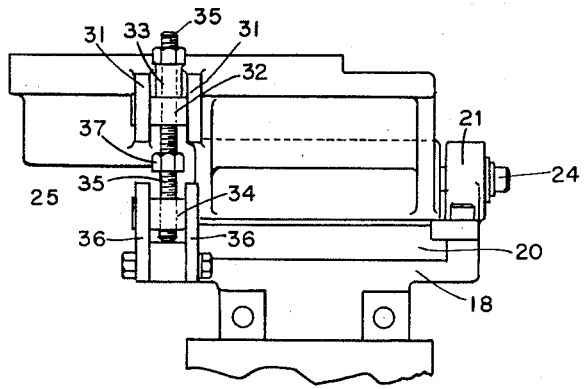
INVENTOR.
ERNST W. ALLARDT
BY
ATTORNEY

INVENTOR.
ERNST W. ALLARDT
ATTORNEY

United States Patent Office 2,933,587
Patented Apr. 19, 1960

2,933,587

WELDING THROAT FOR HIGH FREQUENCY ALTERNATING CURRENT RESISTANCE WELDING OF TUBES

Ernst W. Allardt, Alliance, Ohio, assignor to The Babcock & Wilcox Company, New York, N.Y., a corporation of New Jersey Application February 13, 1959, Serial No. 793,025

11 Claims. (Cl. 219—59)

This invention relates to the electric resistance welding of metal tubing and, more particularly, to improved apparatus for such welding when using alternating currents at very high frequencies of the order of 450 kilocycles.

In the manufacture of electric resistance welded tubing, a substantially continuous length of steel strip is fed through forming means which gradually impart a transverse curvature of increasing degree thereto until the strip has the shape of an open tube. The open tube is then progressively fed between pressure rolls, with the edges of the strip converging so as to engage at the pressure rolls, and a relatively heavy electric current is caused to flow between the abutting edges, pressed together by the pressure rolls, to form a seam weld closing the tube. Inside and outside bead trimmers are provided at or just beyond the welding zone to trim the excess metal from the seam weld leaving substantially smooth exterior and interior surfaces on the tube. The completed tubing is then further processed, progressively or otherwise, as necessary or desirable.

The more commonly used electric resistance tube welding methods involve the use of direct current or alternating current of relatively low frequencies, such as those of the order of 60 to 360 c.p.s. When using direct current or relatively low frequency alternating current, rotary electrodes engaging the tube adjacent the abutting edges at the pressure rolls are used to effect the welding current flow across the tube edges. Each welding setup involves a pair of coaxial rotary electrodes electrically isolated from each other and having transversely arcuate peripheries engaging the tube adjacent the abutting edges over an arcuate extent sufficient to provide an electrode-to-tube contact arc large enough to prevent arcing and burning at the contact area.

The portion of the tube periphery not in pressure engagement with the electrodes is substantially all confiningly engaged by the transversely arcuate peripheries of the cooperating pressure rolls. In a typical installation, there may be two of these pressure rolls, one on each side of the tubing, rotating on vertical axes substantially in the common axial plane of the electrodes. The peripheries of the two pressure rolls are substantially contiguous at a line on the tube surface diametrically opposite the welding seam, and the periphery of each roll contacts the tube over an arc substantially in excess of 90 degrees and terminating just short of the arc engaged by the welding electrode on the same side of the seam.

The arrangement of the welding electrodes and pressure rolls substantially in a common axial plane constitutes what is known, to those skilled in the art of electric resistance welded tubing, as a "welding throat." It will be observed that the combination of welding electrodes and pressure rolls at the welding throat confines the tubing throughout a major part of its circumference sufficiently approximating 360 degrees that the tube may be said to be completely confined peripherally. The totality of peripheral confinement of the tube is interrupted only by the necessary small clearances between peripheral portions of adjacent electrodes and pressure rolls.

The welding electrodes, engaging the tubing closely adjacent each side of the newly formed welded seam, serve as an anvil or back-up means against the outer surface of the tubing resisting outward deformation at the seam as the inside bead trimmer removes excess metal from the inner surface of the weld. This permits a cleaner "cut" to be taken by the inside bead trimmer and without distortion of the tube. Also, these electrodes tend to "smooth" the outer side of the welded seam.

However, in electric resistance welding tubes using alternating currents at a frequency of from 100 to 450 or more kilocycles, the current is not introduced into the tubing at the zone where the converging tubing edges initially engage each other. At these high frequencies, the current follows the path of lowest inductance rather than the path of least resistance. The path of least inductance is that parallel to the return flow path of the current. Advantage is taken of this factor by introducing the current to the spaced tube edges upstream from their point of contact at the pressure roll zone, so that the current, due to the "skin effect" particularly characteristic of high frequency alternating current, flows along the surface of the converging strip edges to the point of contact thereof at the pressure roll zone. This "skin effect" concentrates the heating effect of the current in the strip edges, raising the latter rapidly to a high temperature with the heating of the strip or tube being confined to extremely narrow zones along the converging edges. As a result, an efficient heating of the edges to be weld united is effected with a greatly reduced electric power input as compared to resistance welding with direct current and low frequency alternating current.

As the current is introduced to the work at a point spaced upstream from the welding throat in this method of electric resistance welding, there are no rotary electrodes at the welding throat. Consequently, other arrangements must be provided for circumferentially confining the tube at the welding throat. The welding throat arrangement usually used in high frequency A.C. resistance welding of tubes comprises a pair of cooperating pressure or squeeze rolls each engaging the tube over substantially one-half of its circumference, the adjacent upper and lower peripheries of the rolls being spaced a few thousandths of an inch from each other for clearance purposes. While generally satisfactory otherwise, this two-roll welding throat arrangement has certain disadvantages when used in high frequency A.C. resistance welding of steel tubes.

More specifically, due to the combined effects of the squeeze pressure and the difference in peripheral speeds of the upper arc of the tube, centered on the weld zone, and the overlying portions of the squeeze rolls, metal galling occurs at the upper peripheral edges or corners of the squeeze rolls at the weld zone. It will be appreciated that, in the case of a roll having a concave periphery engaging the tube and with the midpoint of this periphery travelling at the same linear speed as the tubing, the extremities of the roll periphery will have a linear speed in excess of that of the tube.

This galling of the squeeze rolls results in scratching of the outer surface of the tube to an extent where the surface quality of the tubing is unacceptable. To avoid such galling, the upper peripheral corners of the squeeze rolls, at the tubing surface, have been relieved to a larger radius. While this procedure alleviated the galling, it altered the shape of the tube-confining throat surface and, under the pressures involved in making the weld, "peaked" welds were formed with the tube being out of round at the weld.

As stated, immediately after formation of the weld, the inside flash or excess weld metal is trimmed off by an inside bead trimmer. This trimmer has a cutting tool maintained precisely in position and with a precisely formed cutting edge so that the depth and shape of cut is such as to result in the inner surface of the tube being uniformly round. With the aforementioned "peaking" of the weld, the inside bead trimmer cannot effect the proper trimming of the weld to provide the uniformly round inner surface for the tube due to the out-of-round distortion of the tube at the weld.

Furthermore, the larger corner relief of the upper peripheries of the squeeze rolls contributes to the tendency to form a partially lapped weld, as opposed to a straight butt weld, where the edges are offset slightly.

To provide a welding throat for high frequency A.C. resistance welding of tubing avoiding the foregoing disadvantages, in accordance with the present invention, the arcuate extent of the squeeze roll peripheries is reduced so that these rolls engage the tubing over arcs extending from either side of the vertical diametric plane of the tubing outwardly and upwardly only slightly beyond the horizontal diametric plane of the tubing, and a third throat roll means is provided, independent of the squeeze roll means, engaging the major portion of the upper semi-circumference of the tubing and relieved sharply at the weld zone.

This third roll means comprises a pair of coaxial rollers electrically isolated from each other and from their common support shaft which is rotatably mounted in a support adjustable laterally, vertically and longitudinally of the tube line for precise positioning of the roll means. The axial plane of these rollers is preferably coincident with the common axial plane of the squeeze rolls.

Utilizing this throat arrangement, welded steel tubing, welded by the high frequency A.C. resistance welding method, has been produced which is acceptable in quality of inner and outer surfaces, being characterized by no scratching of the outer surface and precise trimming of the inside weld bead.

For an understanding of the invention principles, reference is made to the following description of typical embodiment thereof as illustrated in the accompanying drawings. In the drawings:

Fig. 3 is a partial end elevation view of the apparatus, taken on the line 3—3 of Fig. 2;

Fig. 4 is a plan view of the welding throat;

Figure 1:
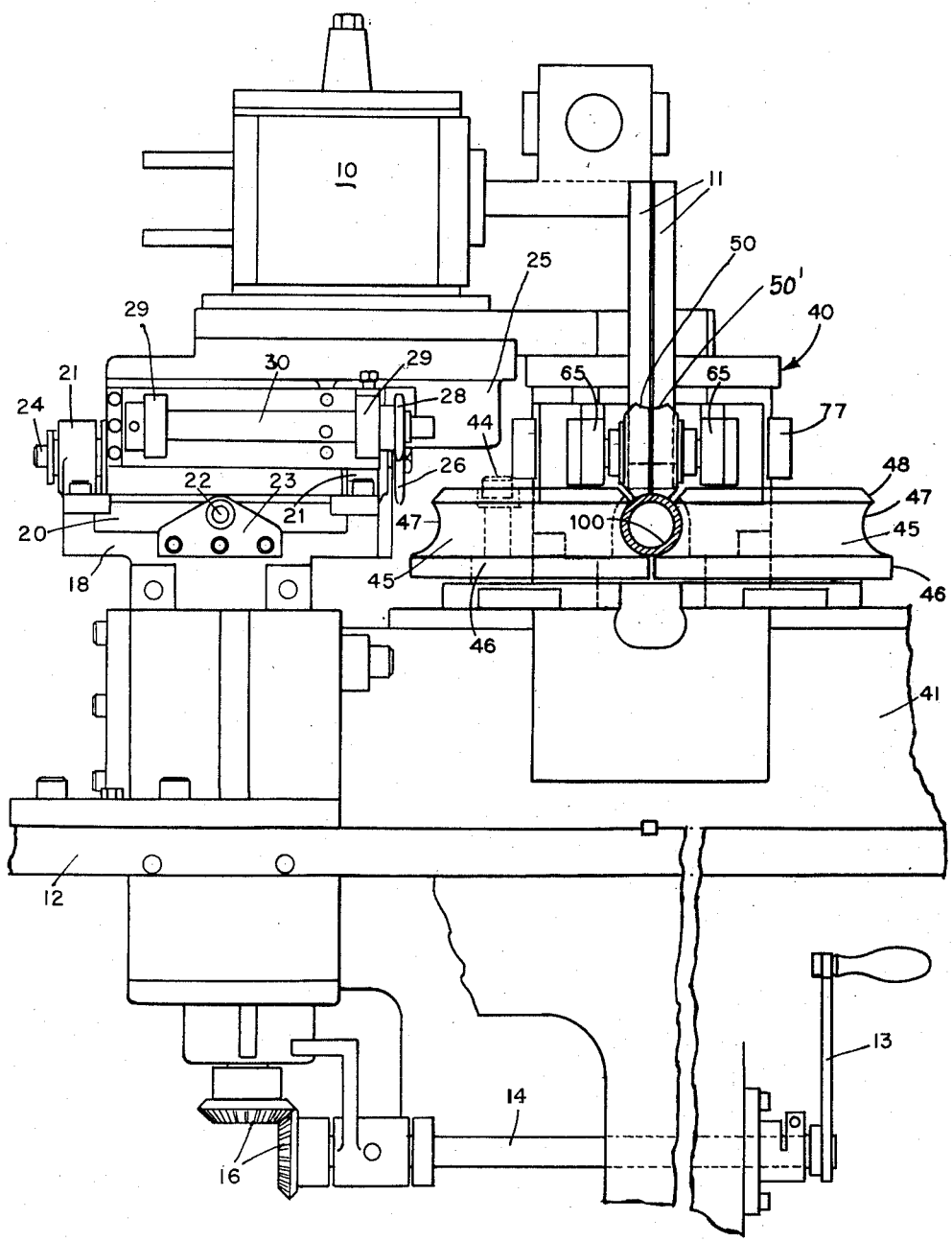
Fig. 1 is an end elevation view, looking toward the welding throat, of high frequency A.C. resistance welding apparatus for forming resistance welded tubing.
Figure 2:
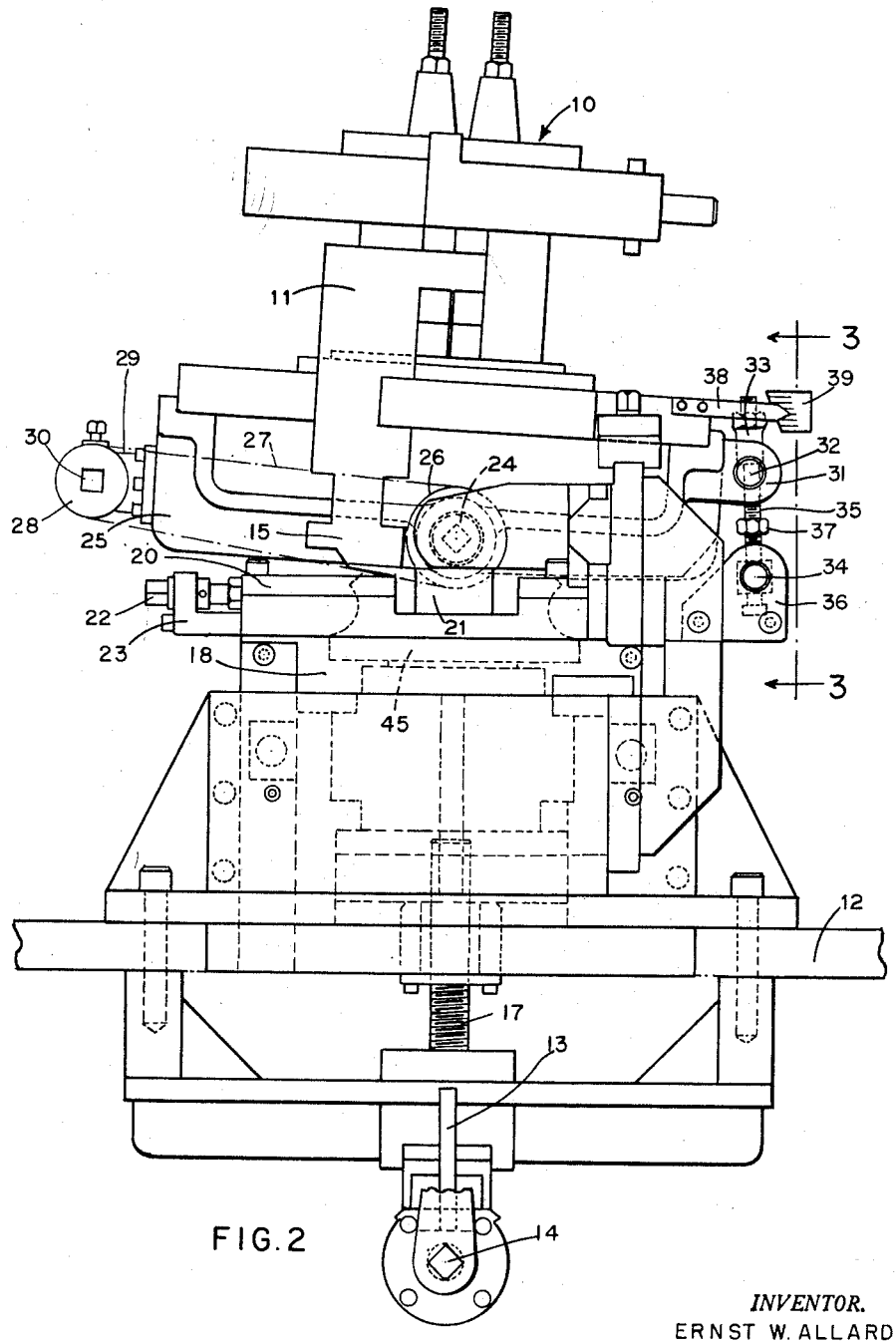
Fig. 2 is a side elevation view of the apparatus.

Referring to Figs. 1, 2 and 3, a tube welding setup utilizing high frequency A.C. resistance welding is illustrated as comprising a transformer 10 from which extend leads 11, 11 delivering high frequency alternating current (i.e. 450 kc.) to contact shoes 15 engaging the outer surface of tubing 100 on either side of the opening between the converging edges thereof as tubing 100 is fed by the usual forming roll stands toward a welding throat generally indicated at 40. The setup includes a supporting framework, generally indicated at 12, on which transformer 10 is mounted for vertical lateral and longitudinal adjustment.

The vertical adjusting or positioning means is indicated generally as including a handle 13 which, through a shaft 14 and bevel gears 16, rotates a threaded shaft 17 cooperating with fixed nut means for raising and lowering a stand 18. A slide 20 on stand 18 is longitudinally adjustable by a screw 22 rotatable in a bracket 23 fixed to stand 18 and held against axial movement relative to the bracket. A second slide 25 is oscillatably mounted intermediate its ends on a shaft 24 mounted in ears 21 on slide 20. Shaft 24 is threaded through a nut on slide 25 for lateral adjustment of this slide, and has a sprocket 26 on one end connected by a chain 27 to a sprocket 28 on an operating shaft 30 having a squared operating end and supported in ears 29 on the upstream end of slide 20. The downstream end of slide 25 has spaced ears 31 receiving a diametrically apertured pin 32 through which extends a threaded shaft 35 engaged by a nut 33. The lower end of shaft 35 is threaded through a diametrical aperture in a pin 34 supported in ears 36 bolted to an extension of slide 20. Shaft 35 has an integral nut portion 37 intermediate its ends. By adjustment of shaft 35, slide 25 is angularly adjusted relative to slide 20.

By the described means, plus other adjustment features not described in detail, transformer 10 is properly positioned so that shoes 15 engage, with the proper pressure, the converging edges of tubing 100 upstream from their point of pressure engagement at welding throat 40. The adjustment means includes a pointer 38 on slide 25 cooperable with a fixed scale 39 supported on a tube line component (not shown) downstream of the welding throat.

Figure 5:
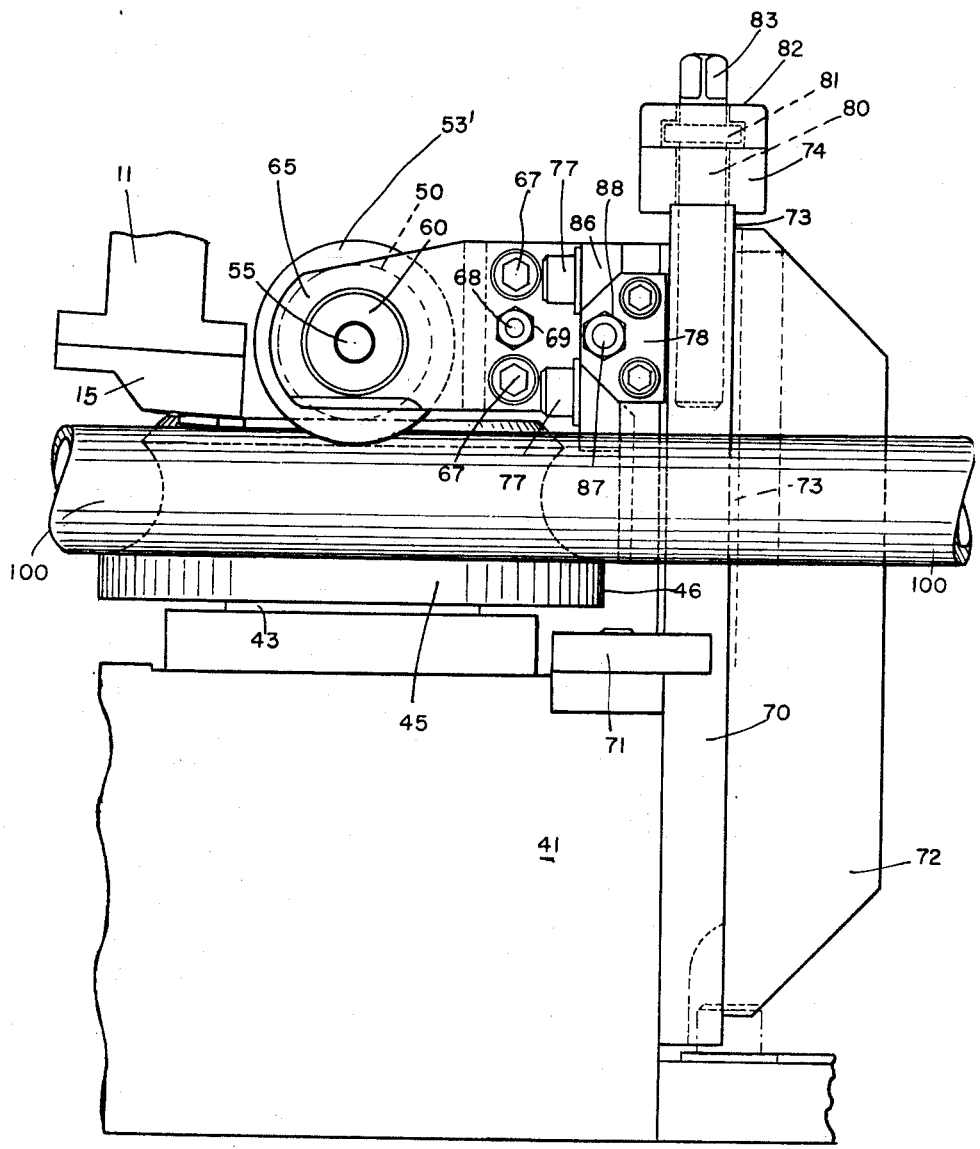
Fig. 5 is a side elevation view of the welding throat.
Figure 6:
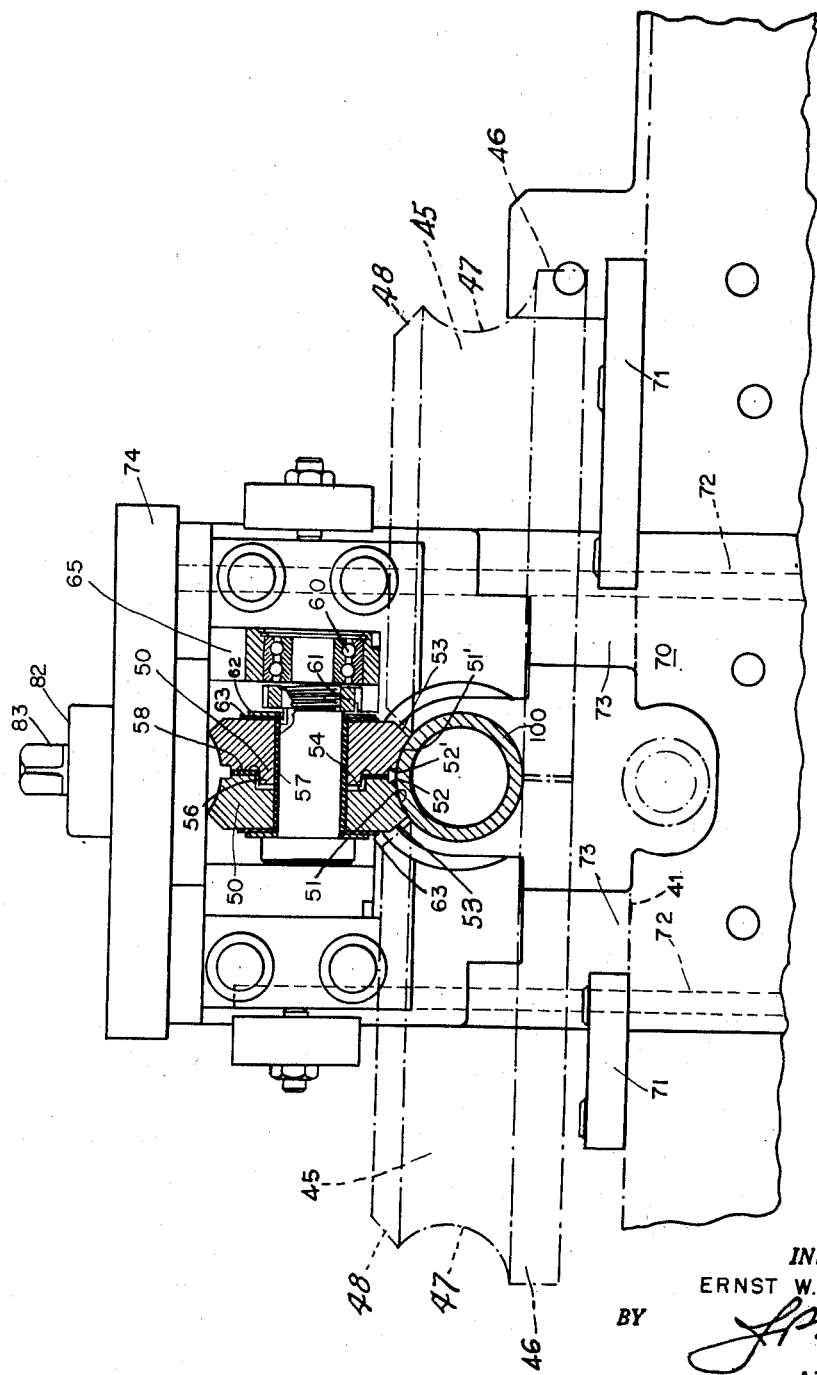
Fig. 6 is an end elevation view of the welding throat, partly in vertical section on the axis of the added coaxial rolls or rollers.

Referring more particularly to Figs. 4, 5 and 6, the welding throat includes a squeeze or pressure roll housing 41 mounted on framework 12. Housing 41 has rotatably mounted therein a pair of laterally spaced vertical shafts 42 on the upper end of each of which is secured a circular plate 43 seating in a central recess in the underside of a squeeze roll 45. Rolls 45 are mounted in electrically isolated relation on plates 43 and are non-rotatably secured thereto by bolts 44 electrically isolated from the rolls.

Rolls 45 have substantially cylindrical lower peripheries 46 spaced from each other several thousandths of an inch and equally spaced from the vertical axial or diametrical plane through tubing 100. Above peripheral portion 46, each roll has a circular concave peripheral portion 47, having a radius of curvature equal to the outer diameter of tubing 100, extending to somewhat above (e.g. 45 degrees) the horizontal diametrical or axial plane of tubing 100. The upper periphery 48 of each squeeze roll is bevelled radially inwardly and upwardly at an angle of approximately 45 degrees. The two squeeze rolls will be seen to confine tubing 100 over its lower semi-cylindrical periphery and about one-half of its upper semi-cylindrical periphery.

In accordance with the invention, that part of the upper peripheral surface of the tubing which, in the standard high frequency A.C. resistance welding of tubing, is also confined by a pair of squeeze rolls each having a concave arcuate periphery of substantially 180 degrees, is confined by a pair of rolls 50, 50' rotatable independently of the squeeze rolls 45. The peripheries of these rolls 50, 50' extend equal arcuate distances on each side of the vertical axial or diametrical plane of tubing 100, through arcs of the order of 45 degrees and thus, in conjunction with squeeze rolls 45, confine the entire peripheral surface of tubing 100 except for short clearance spaces between adjacent rolls around such peripheral surface.

Rolls 50, 50' have circular concave peripheries 51, 51' concentric with the outer surface of tubing 100 and extending between rectangular notches 52, 52' at the weld zone and bevelled surfaces 53, 53' extending radially inwardly and axially outwardly. The rolls are generally mates of each other, with roll 50 having a recess 54 seating a hub extension 56 on roll 50'.

Rolls 50, 50' are mounted on a shaft 55, being electrically isolated therefrom by a dielectric sleeve 57, and a dielectric washer 58 is set over hub 56 and interposed between the axially inner faces of the rolls. Nuts 61, threaded on shaft 55 and spaced from rolls 50, 50' by metal washers 62 and dielectric washers 63, position the rolls axially of the shaft. Shaft 55 has reduced ends received in anti-friction bearings 60 in the free ends of arms 65.

The supporting arrangement for rolls 50, 50' comprises a relatively heavy vertical plate 70 bolted to the downstream end wall of squeeze roll housing 41. Plate 70 has horizontal extensions 71 bolted to the upper wall of housing 41 and has outwardly extending reinforcing flanges or ribs 72 extending vertically thereof. Above the upper wall of housing 41, plate 70 is formed as a pair of laterally spaced vertical columns 73 whose upper ends are interconnected by a cross-bar 74.

Columns 73 slidably guide a vertically movable H-shape slide 75, wear strips or liners 76 being interposed between columns 73 and slide 75. For vertically adjusting slide 75, a threaded shaft 80 is rotatably inserted through a central aperture in bar 74 and has a collar 81 engaging the bar and enclosed by a cap 82 secured to the bar, shaft 80 having an operating end 83. The lower end of shaft 80 is threaded into slide 75.

A T-shape slide 85 is bolted to the upstream face of slide 75 by bolts 77 extending through horizontally elongated apertures in the web 86 of slide 85. Slide 85 is adjusted laterally by set screws 87 threaded through brackets 78 bolted to the edges of slide 75, the set screws having lock nuts 88 thereon.

The stem 84 of slide 85 has vertically extending rectangular grooves 89 along its side edges which slidably receive rectangular ribs 66 on arms 65. These arms are positioned on and secured to stem 84 by means of pins 67 and set screws 68 provided with lock nuts 69.

It will be seen that the described support means provides for accurate vertical and lateral positioning of the rolls 50, 50', which are inter-changeable, with squeeze rolls 45, for different diameters of tubing.

Due to the relatively small arcs of contact of each roll 50, 50' with tubing 100, there is very little difference in linear speed between any part of the periphery of either roll 50 or 50' and the outer surface of tubing 100. Nevertheless, these rolls, in conjunction with squeeze rolls 45 maintain the newly welded tubing circular and provide proper backing for accurate operation of the inside bead trimmer. Also, the small arcuate extent of squeeze rolls 45 above the horizontal axial or diametrical plane of tubing 100 precludes their being any excessive differential in the linear speed of the upper part of tubing 100 and the upper part of the arcuate peripheries of rolls 45. The notches 52, 52' provide reliefs in the peripheries of rolls 50, 50' at the weld, but no "peaking" of the weld is possible due to the conjoint confining action of rolls 45 and rolls 50, 50'.

While a specific embodiment of the invention has been shown and described in detail to illustrate the application of the invention principles, it will be understood that the invention may be embodied otherwise without departing from such principles.

What is claimed is:

1. Electric resistance tube welding apparatus comprising, in combination, electric current conducting means engaging the converging edges of partly formed tubing upstream of the point of convergence of the edges for heating of the edges by current flow therealong between the current conducting means and the point of convergence; a pair of laterally aligned squeeze rolls engaging opposite sides of the tubing at such point of convergence, each squeeze roll engaging the tubing over an arc extending substantially from a point diametrically opposite the converging edges to a point spaced from such converging edges; and a pair of coaxial pressure rolls electrically isolated from each other, engaging the tubing on either side of the converging edges over substantially all the remaining arcuate extent of the tubing surface except for a small arc directly at the weld zone; the squeeze rolls and pressure rolls conjointly forming a welding throat enclosing the tubing throughout its peripheral extent except for small clearances between the peripheries of adjacent rolls.

2. Electric resistance tube welding apparatus comprising, in combination, electric current conducting means engaging the converging edges of partly formed tubing upstream of the point of convergence of the edges for heating of the edges by current flow therealong between the current conducting means and the point of convergence; a pair of laterally aligned squeeze rolls having transversely concave peripheries engaging opposite sides of the tubing at such point of convergence, each squeeze roll engaging the tubing over an arc extending substantially from a point diametrically opposite the converging edges to a point spaced not less than 45 degrees from such converging edges; and a pair of coaxial pressure rolls electrically isolated from each other, having transversely concave peripheries engaging the tubing on either side of the converging edges over substantially all the remaining arcuate extent of the tubing surface except for a small arc directly at the weld zone; the squeeze rolls and pressure rolls conjointly forming a welding throat enclosing the tubing throughout its peripheral extent except for small clearances between the peripheries of adjacent rolls.

3. Electric resistance tube welding apparatus comprising, in combination, electric current conducting means engaging the converging edges of partly formed tubing upstream of the point of convergence of the edges for heating of the edges by current flow therealong between the current conducting means and the point of convergence; a pair of laterally aligned squeeze rolls having transversely concave peripheries engaging opposite sides of the tubing at such point of convergence, each squeeze roll engaging the tubing over an arc extending substantially from a point diametrically opposite the converging edges to a point spaced from such converging edges; and a pair of coaxial pressure rolls electrically isolated from each other and from said squeeze rolls, having transversely concave peripheries engaging the tubing on either side of the converging edges over substantially all the remaining arcute extent of the tubing surface; the adjacent peripheries of said pressure rolls being relieved from the tubing surface at the weld zone; the squeeze rolls and pressure rolls conjointly forming a welding throat enclosing the tubing throughout its peripheral extent except for small clearances between the peripheries of adjacent rolls.

4. For use in forming electric resistance welded tubing utilizing high frequency alternating current of the order of 450 k.c., the current being supplied to the tubing by electric current conducting means engaging the converging edges of partly formed tubing upstream of the point of convergence of the edges for heating of the edges by current flow therealong between the current conducting means and the point of convergence: a welding throat at such point of convergence comprising, in combination, a pair of laterally aligned squeeze rolls having transversely concave peripheries engaging opposite sides of the tubing at such point of convergence, each squeeze roll engaging the tubing over an arc extending substantially from a point diametrically opposite the converging edges to a point spaced from such converging edges; and pressure roll means engaging the tubing on either side of the converged edges over substantially all of the remaining arcuate extent of the tubing surface except for a small arc directly at the weld zone at which location said pressure roll means is formed with a notch extending throughout the circumference of said pressure roll means; the squeeze rolls and pressure roll means conjointly forming a welding throat enclosing the tubing throughout its peripheral extent except for small clearances between the peripheries of adjacent rolls.

5. For use in forming electric resistance welded tubing utilizing high frequency alternating current of the order of 450 k.c., the current being supplied to the tubing by electric current conducting means engaging the converging edges of partly formed tubing upstream of the point of convergence of the edges for heating of the edges by current flow therealong between the current conducting means and the point of convergence: a welding throat at such point of convergence comprising, in combination, a pair of laterally aligned squeeze rolls having transversely concave peripheries, each squeeze roll engaging the tubing over an arc extending substantially from a point diametrically opposite the converging edges to a point spaced not less than 45 degrees from such converging edges; and a pair of coaxial pressure rolls electrically isolated from each other, having transversely concave peripheries engaging the tubing on either side of the converging edges over substantially all the remaining arcuate extent of the tubing surface except for a small arc directly at the weld zone; the squeeze rolls and pressure rolls conjointly forming a welding throat enclosing the tubing throughout its peripheral extent except for small clearances between the peripheries of adjacent rolls.

6. For use in forming electric resistance welded tubing utilizing high frequency alternating current of the order of 450 k.c., the current being supplied to the tubing by electric current conducting means engaging the converging edges of partly formed tubing upstream of the point of convergence of the edges for heating of the edges by current flow therealong between the current conducting means and the point of convergence: a welding throat at such point of convergence comprising, in combination, a pair of laterally aligned squeeze rolls having transversely concave peripheries engaging opposite sides of the tubing at such point of convergence, each squeeze roll engaging the tubing over an arc extending substantially from a point diametrically opposite the converging edges to a point spaced not less than 45 degrees from such converging edges; and a pair of coaxial pressure rolls electrically isolated from each other and from said squeeze rolls, having transversely concave peripheries engaging the tubing on either side of the converging edges over substantially all the remaining arcuate extent of the tubing surface; the adjacent peripheries of said pressure rolls being relieved from the tubing surface at the weld zone; the squeeze rolls and pressure rolls conjointly forming a welding throat enclosing the tubing throughout its peripheral extent except for small clearances between the peripheries of adjacent rolls.

7. For use in forming electric resistance welded tubing utilizing high frequency alternating current of the order of 450 kc., the current being supplied to the tubing by electric current conducting means engaging the converging edges of partly formed tubing upstream of the point of convergence of the edges for heating of the edges by current flow therealong between the current conducting means and the point of convergence: a welding throat at such point of convergence comprising, in combination, a squeeze roll stand including a pair of laterally aligned squeeze rolls having transversely concave peripheries, each squeeze roll engaging the tubing over an arc extending substantially from a point diametrically opposite the converging edges to a point spaced not less than 45 degrees from such converging edges; and support means on said weld stand rotatably supporting a pair of coaxial pressure rolls electrically isolated from each other, engaging the tubing on either side of the converging edges over substantially all the remaining arcuate extent of the tubing surface except for a small arc directly at the weld zone; the squeeze rolls and pressure rolls conjointly enclosing the tubing throughout its peripheral extent except for small clearances between the peripheries of adjacent rolls.

8. For use in forming electric resistance welded tubing utilizing high frequency alternating current of the order of 450 kc., the current being supplied to the tubing by electric current conducting means engaging the converging edges of partly formed tubing upstream of the point of convergence of the edges for heating of the edges by current flow therealong between the current conducting means and the point of convergence: a welding throat at such point of convergence comprising, in combination, a squeeze roll stand including a pair of laterally aligned squeeze rolls having transversely concave peripheries, each squeeze roll engaging the tubing over an arc extending substantially from a point diametrically opposite the converging edges to a point spaced not less than 45 degrees from such converging edges; and support means on said weld stand rotatably supporting a pair of coaxial pressure rolls electrically isolated from each other, engaging the tubing on either side of the converging edges over substantially all the remaining arcuate extent of the tubing surface, the tube engaging peripheries of said pressure rolls being transversely concave except for circumferential notches at the adjacent edges of the two peripheries; the squeeze rolls and pressure rolls conjointly enclosing the tubing throughout its peripheral extent except for small clearance between the peripheries of adjacent rolls.

9. For use in forming electric resistance welded tubing utilizing high frequency alternating current of the order of 450 kc., the current being supplied to the tubing by electric current conducting means engaging the converging edges of partly formed tubing upstream of the point of convergence of the edges for heating of the edges by current flow therealong between the current conducting means and the point of convergence: a welding throat at such point of convergence comprising, in combination, a squeeze roll stand including a pair of laterally aligned squeeze rolls having transversely concave peripheries, each squeeze roll engaging the tubing over an arc extending substantially from a point diametrically opposite the converging edges to a point spaced not less than 45 degrees from such converging edges; a support bracket on said stand downstream of the squeeze rolls; cantilever arm means extending upstream from said bracket; and a pair of coaxial pressure rolls electrically isolated from each other and rotatably supported in the free ends of said arm means on an axis in the common axial plane of said squeeze rolls, said pressure rolls engaging the tubing on either side of the converging edges over substantially all the remaining arcuate extent of the tubing surface; the squeeze rolls and pressure rolls conjointly enclosing the tubing throughout is peripheral extent except for small clearances between the peripheries of adjacent rolls.

10. For use in forming electric resistance welded tubing utilizing high frequency alternating current of the order of 450 kc., the current being supplied to the tubing by electric current conducting means engaging the converging edges of partly formed tubing upstream of the point of convergence of the edges for heating of the edges by current flow therealong between the current conducting means and the point of convergence: a welding throat at such point of convergence comprising, in combination, a squeeze roll stand including a pair of laterally aligned squeeze rolls having transversely concave peripheries engaging opposite sides of the tubing at such point of convergence, each squeeze roll engaging the tubing over an arc extending substantially from a point diametrically opposite the converging edges to a point spaced not less than 45 degrees from such converging edges; a support bracket on said stand downstream of the squeeze rolls and including vertical column means extending above said stand; a slide adjustable vertically along said column means; cantilever arm means extending upstream from said slide; and a pair of coaxial pressure rolls electrically isolated from each other and rotatably supported in the free ends of said arm means on an axis in the common axial plane of said squeeze rolls, said pressure rolls engaging the tubing on either side of the converging edges over substantially all the remaining arcuate extent of the tubing surface except for a small arc directly at the weld zone; the squeeze rolls and pressure rolls conjointly enclosing the tubing throughout its peripheral extent except for small clearances between the peripheries of adjacent rolls.

11. For use in forming electric resistance welded tubing utilizing high frequency alternating current of the order of 450 kc., the current being supplied to the tubing by electric current conducting means engaging the converging edges of partly formed tubing upstream of the point of convergence of the edges for heating of the edges by current flow therealong between the current conducting means and the point of convergence: a welding throat at such point of convergence comprising, in combination, a squeeze roll stand including a pair of laterally aligned squeeze rolls having transversely concave peripheries engaging opposite sides of the tubing at such point of convergence, each squeeze roll engaging the tubing over an arc extending substantially from a point diametrically opposite the converging edges to a point spaced not less than 45 degrees from such converging edges; a support bracket on said stand downstream of the squeeze rolls and including vertical column means extending above said stand; a first slide adjustable vertically along said column means; a second slide adjustable laterally of said first slide and including cantilever arm means extending upstream from said bracket above said squeeze rolls; and a pair of coaxial pressure rolls electrically isolated from each other and rotatably supported in the free ends of said arm means on an axis in the common axial plane of said squeeze rolls, said pressure rolls engaging the tubing on either side of the converging edges over substantially all the remaining arcuate extent of the tubing surface except for a small arc directly at the weld zone; the squeeze rolls and pressure rolls conjointly enclosing the tubing through its peripheral extent except for small clearances between the peripheries of adjacent rolls; the tube engaging peripheries of said pressure rolls being transversely concave except for circumferential notches at the adjacent edges of the two peripheries.

References Cited in the file of this patent

UNITED STATES PATENTS

| | | |
|---|---|---|
| 2,762,902 | Hankin | Sept. 11, 1956 |
| 2,823,294 | Crawford | Feb. 11, 1958 |